(12) United States Patent
Tsuchiya et al.

(10) Patent No.: US 8,259,211 B2
(45) Date of Patent: Sep. 4, 2012

(54) LENS DRIVER AND IMAGE PICKUP APPARATUS

(75) Inventors: Takahiro Tsuchiya, Aichi (JP); Masanobu Inada, Aichi (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 12/556,082

(22) Filed: Sep. 9, 2009

(65) Prior Publication Data

US 2010/0060778 A1 Mar. 11, 2010

(30) Foreign Application Priority Data

Sep. 10, 2008 (JP) ................................. 2008-232104

(51) Int. Cl.
*H04N 5/225* (2006.01)
(52) U.S. Cl. ........................................ 348/340; 348/345
(58) Field of Classification Search .................. None
See application file for complete search history.

(56) References Cited

U.S. PATENT DOCUMENTS 5,672,862 A 9/1997 O'hara et al.

FOREIGN PATENT DOCUMENTS

| JP | 3197995 | 2/1995 |
|---|---|---|
| JP | 07-301738 | 11/1995 |
| JP | 3516110 | 9/1997 |
| JP | 2000-137155 | 5/2000 |
| JP | 2000137155 A | * 5/2000 |
| JP | 2003-057522 | 2/2003 |
| JP | 2006-058657 | 3/2006 |
| JP | 2006293007 | 10/2006 |
| JP | 2007-139862 | 6/2007 |
| JP | 2007-271990 | 10/2007 |
| JP | 2007271990 A | * 10/2007 |
| JP | 2008-164920 | 7/2008 |
| JP | 2006162803 | 6/2009 |

OTHER PUBLICATIONS

Japanese Office Action for corresponding Japanese Appln. No. JP 2008-232104 issued on Aug. 26, 2010.
Japanese Office Action for corresponding JP2008-232104 issued on Jun. 10, 2010.

\* cited by examiner

*Primary Examiner* — Jason Chan
*Assistant Examiner* — Yih-Sien Kao
(74) *Attorney, Agent, or Firm* — K&L Gates LLP

(57) ABSTRACT

A lens driver includes a lens unit, a polymer actuator, and an orthogonal transformation mechanism. The lens unit includes a lens holding frame having a pressed portion at an outer peripheral surface of the lens unit, a lens being held thereby. The lens unit is movable in an optical-axis direction of the lens. The polymer actuator is arranged outside the outer peripheral surface and having an electrode to which a voltage is applied. The polymer actuator is bent in a direction orthogonal to the optical-axis direction and presses the pressed portion in that direction when the voltage is applied to the electrode. The orthogonal transformation mechanism converts a force in a pressing direction into a moving force in the optical-axis direction and moves the lens unit in the optical-axis direction when the pressed portion of the lens holding frame is pressed by the bent polymer actuator.

6 Claims, 15 Drawing Sheets

LENS DRIVER AND IMAGE PICKUP APPARATUS

CROSS REFERENCES TO RELATED APPLICATIONS

The present application claims priority to Japanese Priority Patent Application JP 2008-232104 filed in the Japan Patent Office on Sep. 10, 2008, the entire content of which is hereby incorporated by reference.

BACKGROUND

The present application relates to a technical field of a lens driver and an image pickup apparatus. In particular, the present application relates to a technical field in which a polymer actuator is arranged outside an outer peripheral surface of a lens unit, which is moved in an optical-axis direction, to decrease the size of the lens unit in a direction orthogonal to the optical-axis direction.

Image pickup apparatuses, such as a video camera and a still camera, each include a lens unit having an image-capturing function. In recent years, a lens unit is included in various electronic devices, such as a mobile phone, a personal computer, and a personal digital assistant (PDA), as the purposes of use of these devices are widened. Therefore, the electronic devices, such as the mobile phone, the personal computer, and the PDA, are used as image pickup apparatuses for capturing images.

An example of such an image pickup apparatus includes a lens unit as a movable part of a lens driver. The lens unit is moved in an optical-axis direction by a polymer actuator for focusing and zooming (for example, see Japanese Unexamined Patent Application Publication No. 2006-293007).

Two types of polymer actuators exist, the two types including an ion conducting actuator and a conductive polymer actuator. The polymer actuators are driving devices whose polymers containing ions are greatly expanded or contracted by applying a voltage of about 2V to the polymer actuators. A polymer actuator includes an ion-exchange resin film (main body) and electrodes bonded to surfaces of the film such that the electrodes are insulated from each other. By applying a potential difference to the electrodes while the ion-exchange resin film is hydrated, the ion-exchange resin film is deformed.

The deformation appears in a transverse direction (bending) and in a longitudinal direction (expanding and contracting). The deformation direction can be designed by changing the structure of the ion-exchange resin film.

SUMMARY

With the lens driver of related art, the lens unit and the polymer actuator are arranged along the optical-axis direction. Therefore, when the polymer actuator is bent in a front-rear direction (optical-axis direction), a part of a lens holding frame located at an outer periphery of a lens is pressed by the polymer actuator, and the lens unit is moved in the optical-axis direction.

When the lens unit and the polymer actuator are arranged along the optical-axis direction, a pressed portion which is pressed by the polymer actuator has to be located at a position separated from an effective optical plane in a direction orthogonal to the optical axis. Hence, the sizes of the lens unit and lens driver may be increased in the direction orthogonal to the optical axis.

In light of the situation, it is desirable to provide a lens driver and an image pickup apparatus each capable of decreasing the size in the direction orthogonal to the optical-axis direction.

According to an embodiment, a lens driver includes a lens unit including a lens holding frame having a pressed portion at an outer peripheral surface of the lens unit, a lens being held by the lens holding frame, the lens unit being movable in an optical-axis direction of the lens; a polymer actuator arranged outside the outer peripheral surface of the lens unit and having an electrode to which a voltage is applied, the polymer actuator configured to be bent in a direction orthogonal to the optical-axis direction and press the pressed portion in the direction orthogonal to the optical-axis direction when the voltage is applied to the electrode; and an orthogonal transformation mechanism configured to convert a force in a pressing direction into a moving force in the optical-axis direction and move the lens unit in the optical-axis direction when the pressed portion of the lens holding frame is pressed by the bent polymer actuator.

Accordingly, since the polymer actuator is arranged outside the outer peripheral surface of the lens unit, the size of the lens unit in the direction orthogonal to the optical axis of the lens unit can be decreased.

Preferably, in the lens driver, a plurality of the polymer actuators may be provided, a plurality of the pressed portions may be provided, the pressed portions respectively pressed by the polymer actuators, and the polymer actuators may be successively bent, to press the pressed portions of the lens holding frame in sequence and the lens unit is continuously moved in the optical-axis direction.

Since the plurality of polymer actuators are provided and are continuously moved in the optical-axis direction, driving of the polymer actuator is switched during movement of the lens unit. Accordingly, a large moving amount of the lens unit can be provided without an increase in size or an increase in cost.

Preferably, in the lens driver, at least one of the polymer actuators may have a recess, and assuming that the polymer actuator without the recess is a first polymer actuator and that the polymer actuator with the recess is a second polymer actuator, at least one of the pressed portions passes through the recess of the second polymer actuator when the first polymer actuator is bent.

Accordingly, the pressed portion which has passed through the recess is located in a bending direction of the second polymer actuator. Thus, a moving operation of the lens unit can be carried out without interruption. The lens driver can be smoothly operated.

Preferably, in the lens driver, at least a part of each electrode of each polymer actuator may be separated in the optical-axis direction.

Accordingly, the arrangement position of the polymer actuator can be freely determined, and operation efficiency can be increased.

Preferably, in the lens driver, the polymer actuators may be long in one direction, and a longitudinal direction of the polymer actuators may be aligned with the optical-axis direction.

Accordingly, the moving direction is aligned with the longitudinal direction of the polymer actuator. Thus, the arrangement space can be efficiently used, and the size of the lens driver can be decreased.

Preferably, in the lens driver, the lens holding frame may be substantially cylindrical, the lens driver may further include a case, the case having a rectangular frame portion and being arranged to surround the lens holding frame from the outside of the outer peripheral surface, and the polymer actuator may be arranged at least at one of four corners in the frame portion.

Accordingly, a dedicated arrangement space for the polymer actuator is not necessary. Thus, the arrangement space can be efficiently used, and the size of the lens unit can be decreased.

According to another embodiment, an image pickup apparatus includes a lens unit including a lens holding frame having a pressed portion at an outer peripheral surface of the lens unit, a lens being held by the lens holding frame, the lens unit being movable in an optical-axis direction of the lens; an image pickup device configured to convert an optical image acquired by the lens into an electric signal; a polymer actuator arranged outside the outer peripheral surface of the lens unit and having an electrode to which a voltage is applied, the polymer actuator configured to be bent in a direction orthogonal to the optical-axis direction and press the pressed portion in the direction orthogonal to the optical-axis direction when the voltage is applied to the electrode; and an orthogonal transformation mechanism configured to convert a force in a pressing direction into a moving force in the optical-axis direction and move the lens unit in the optical-axis direction when the pressed portion of the lens holding frame is pressed by the bent polymer actuator.

Accordingly, since the polymer actuator is arranged outside the outer peripheral surface of the lens unit, the size of the lens driver in the direction orthogonal to the optical axis of the lens driver can be decreased.

Additional features and advantages are described herein, and will be apparent from the following Detailed Description and the figures.

DETAILED DESCRIPTION

A lens driver and an image pickup apparatus according to preferred embodiments of the present application will be described below with reference to the attached drawings according to an embodiment.

In the embodiments, the image pickup apparatus is applied to a mobile phone, and the lens driver is applied to a lens driver included in the mobile phone. The application of the image pickup apparatus or the lens driver is not limited to the mobile phone or the lens driver included therein. For example, the image pickup apparatus may be applied to various apparatuses used as image pickup apparatuses, such as a still camera, a video camera, a personal computer, and a personal digital assistant (PDA), and the lens driver may be applied to various lens drivers included in the various apparatuses.

In the following description, front-rear, up-down, and left-right directions are determined with reference to a viewing direction of a user during image capturing with the image pickup apparatus. Hence, an object is located at the front side, and the user is located at the rear side.

The front-rear, up-down, and left-right directions are determined merely for the convenience of description. The directions are not limited to those in the embodiments.

Figure 1:
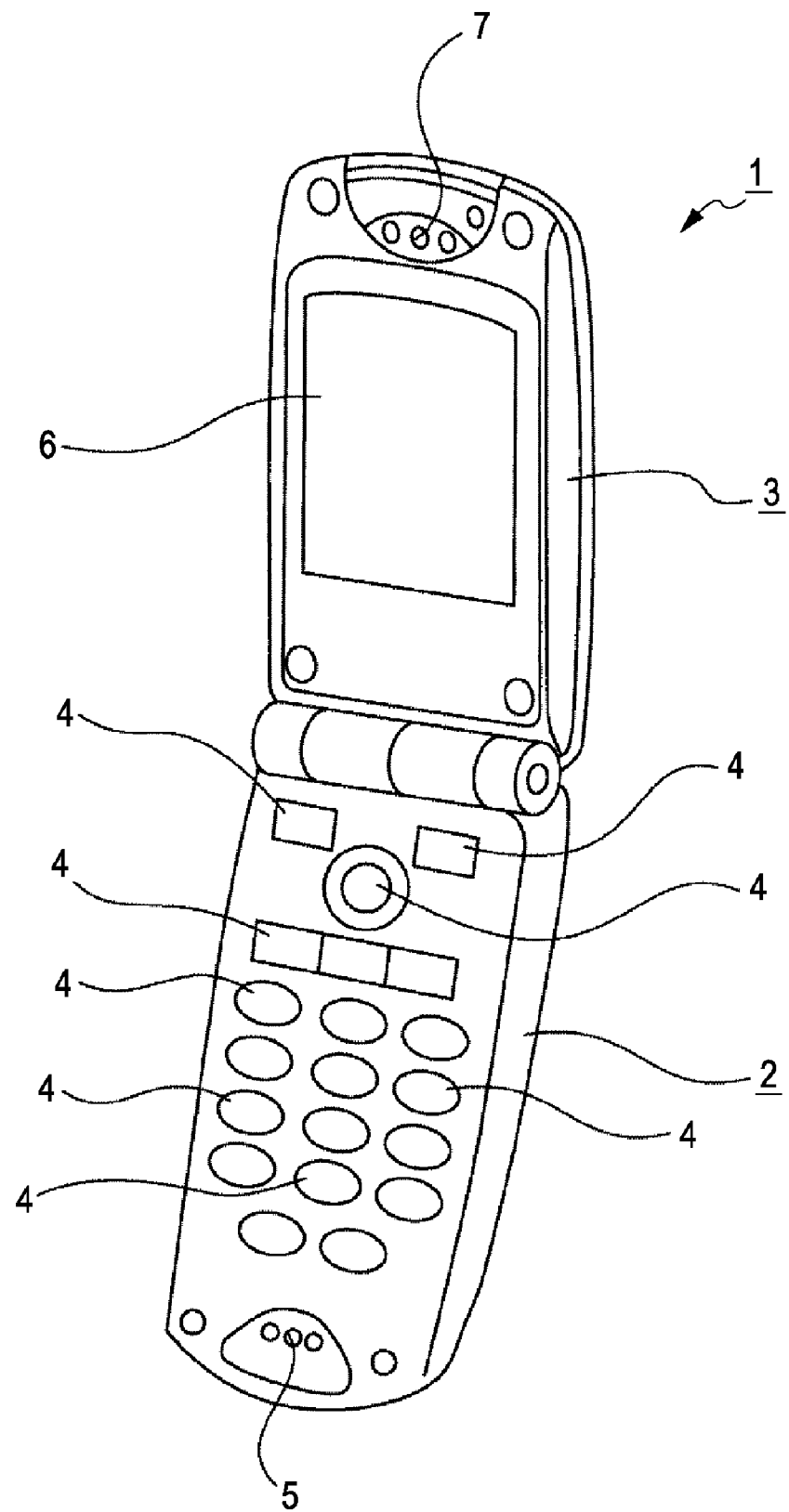
FIG. 1, together with FIGS. 2 to 16, shows a preferred embodiment, and is a perspective view of an image pickup apparatus.
Figure 2:
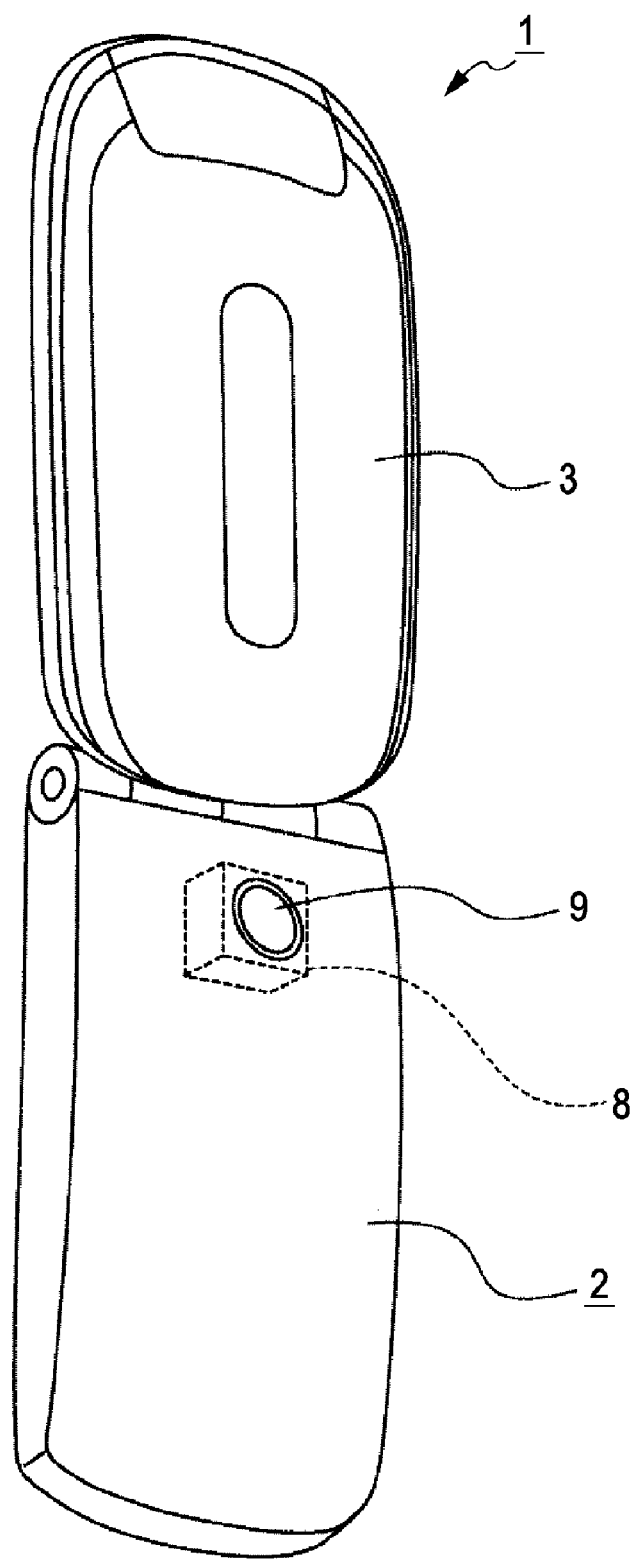
FIG. 2 is a perspective view of the image pickup apparatus when viewed in a direction different from a viewing direction of FIG. 1.

Referring to FIGS. 1 and 2, an image pickup apparatus (mobile phone) 1 has a first case 2 and a second case 3 which are coupled to each other via a hinge mechanism (not shown) in a foldable manner.

Operation keys 4 are arranged on one surface of the first case 2. A microphone 5 is provided at a lower end portion of the one surface of the first case 2. User's voice is input to the microphone 5.

In addition to the operation keys 4 and the microphone 5, the first case 2 has, for example, an interface connector and an earphone jack (not shown).

A display portion (liquid crystal display panel) 6 is arranged on one surface of the second case 3. The display portion 6 displays various information, such as reception of radio waves, a remaining battery level, a target phone number, registered content in a telephone directory (i.e., phone numbers and names), dialed numbers, received calls, and other registered content.

A speaker 7 is provided at an upper end portion of the second case 3. The voice and the like of the target is output from the speaker 7 during making a call.

The image pickup apparatus 1 includes a lens driver 8, for example, in the first case 2 (see FIG. 2). The first case 2 has a cover lens 9 attached thereto at a position corresponding to the lens driver 8.

During image capturing with the image pickup apparatus 1, when a lens (described below) of the lens driver 8 acquires an optical image through the cover lens 9, an image pickup device (not shown) arranged in the image pickup apparatus 1 converts the acquired optical image into an electric signal. The converted electric signal is stored in a storage unit, such as a memory. The electric signal can be output to the display portion 6.

Figure 3:
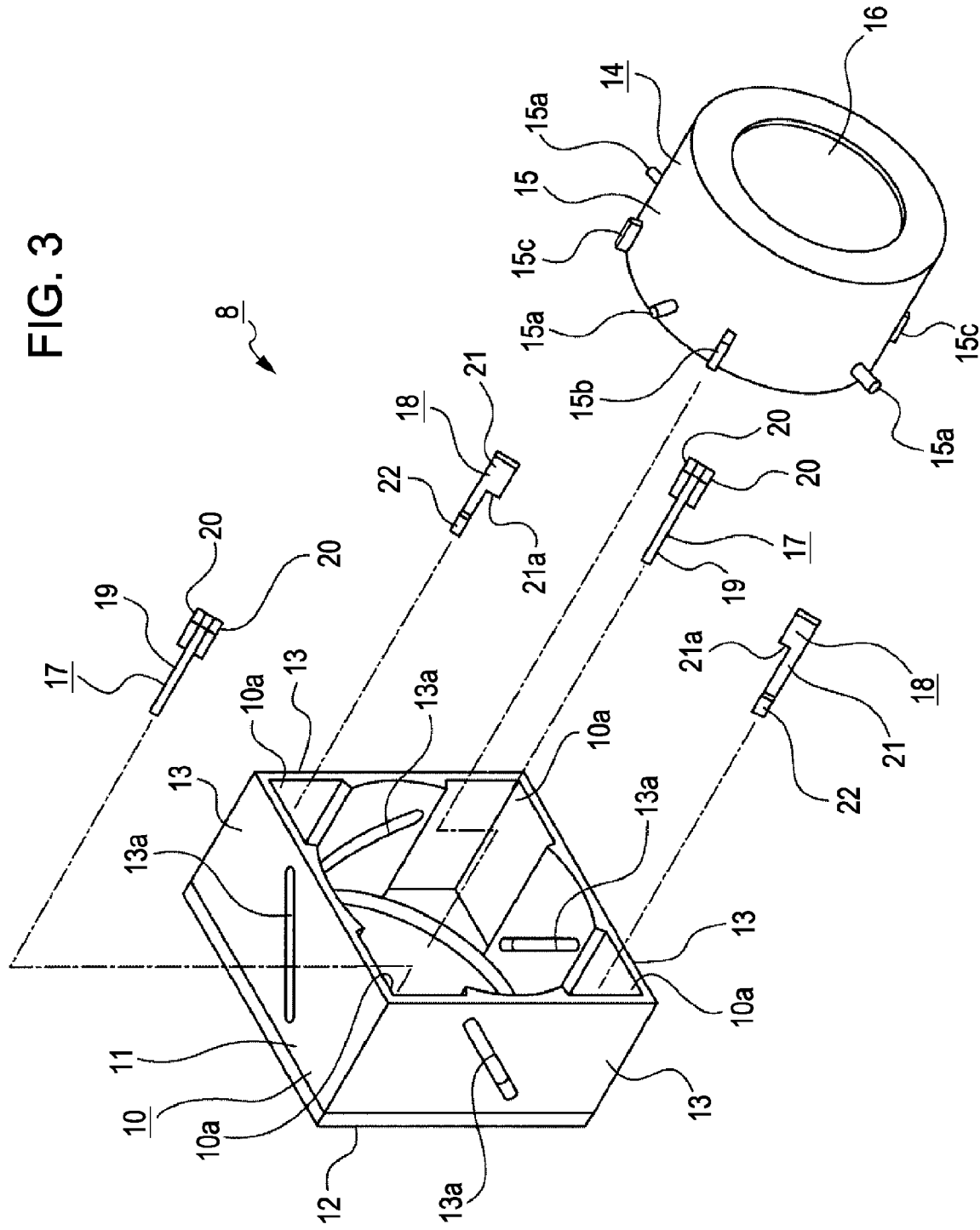
FIG. 3 is an enlarged exploded perspective view showing a lens driver.
Figure 4:
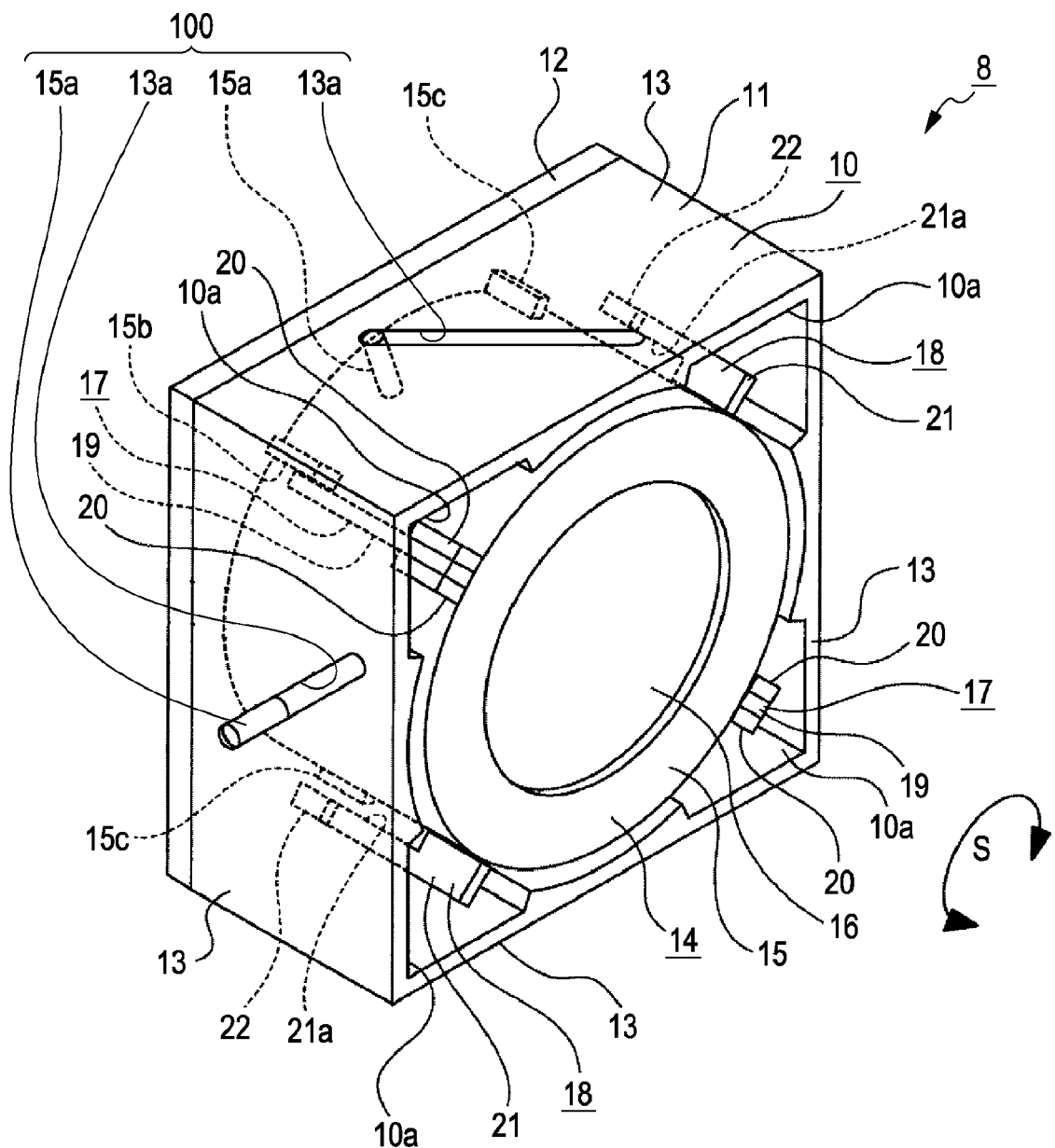
FIG. 4 is an enlarged perspective view showing the lens driver.

The lens driver 8 includes components arranged in a case 10 (see FIGS. 3 and 4).

The case 10 is a substantially rectangular box with a front side being open. The case 10 includes a frame 11 which is an outer peripheral portion, and a rear surface 12 attached to the rear side of the frame 11. The frame 11 includes four side surfaces 13. Each side surface 13 has a cam groove 13a. The cam groove 13a is inclined at a predetermined angle with respect to the front-rear direction.

The case 10 supports a lens unit 14 movably in the front-rear direction. The lens unit 14 includes a lens barrel 15 and a lens 16. The lens barrel 15 is substantially cylindrical. The axis direction of the lens unit 14 is along the front-rear direction. The lens barrel 15 holds the lens 16. The lens barrel 15 holds other lenses in addition to the lens 16.

Four cam pins 15a protrude in a radial direction from a rear end portion of an outer peripheral surface of the lens barrel 15, at an interval in a circumferential direction. Also, four pressed portions 15b, 15c, 15b, and 15c are alternately arranged and protrude in the radial direction from the rear end portion of the outer peripheral surface of the lens barrel 15, at an interval in the circumferential direction. The pressed portions 15b and 15c each are arranged between the cam pins 15a.

The cam pins 15a of the lens unit 14 are supported slidably along the cam grooves 13a of the frame 11. Hence, the case 10 supports the lens unit 14 movably in the front-rear direction. When the lens unit 14 is supported by the case 10, the lens unit 14 is biased to the rear side by a biasing spring (not shown).

When the lens unit 14 is rotated around the axis (in S direction shown in FIG. 4), the cam pins 15a are moved in the front-rear direction with respect to the case 10 while being guided by the cam grooves 13a. Thus, the cam pins 15a and the cam grooves 13a function as an orthogonal transformation mechanism 100 which converts a rotating force around the axis of the lens unit 14 into a moving force in the front-rear direction orthogonal to the axis.

Figure 5:
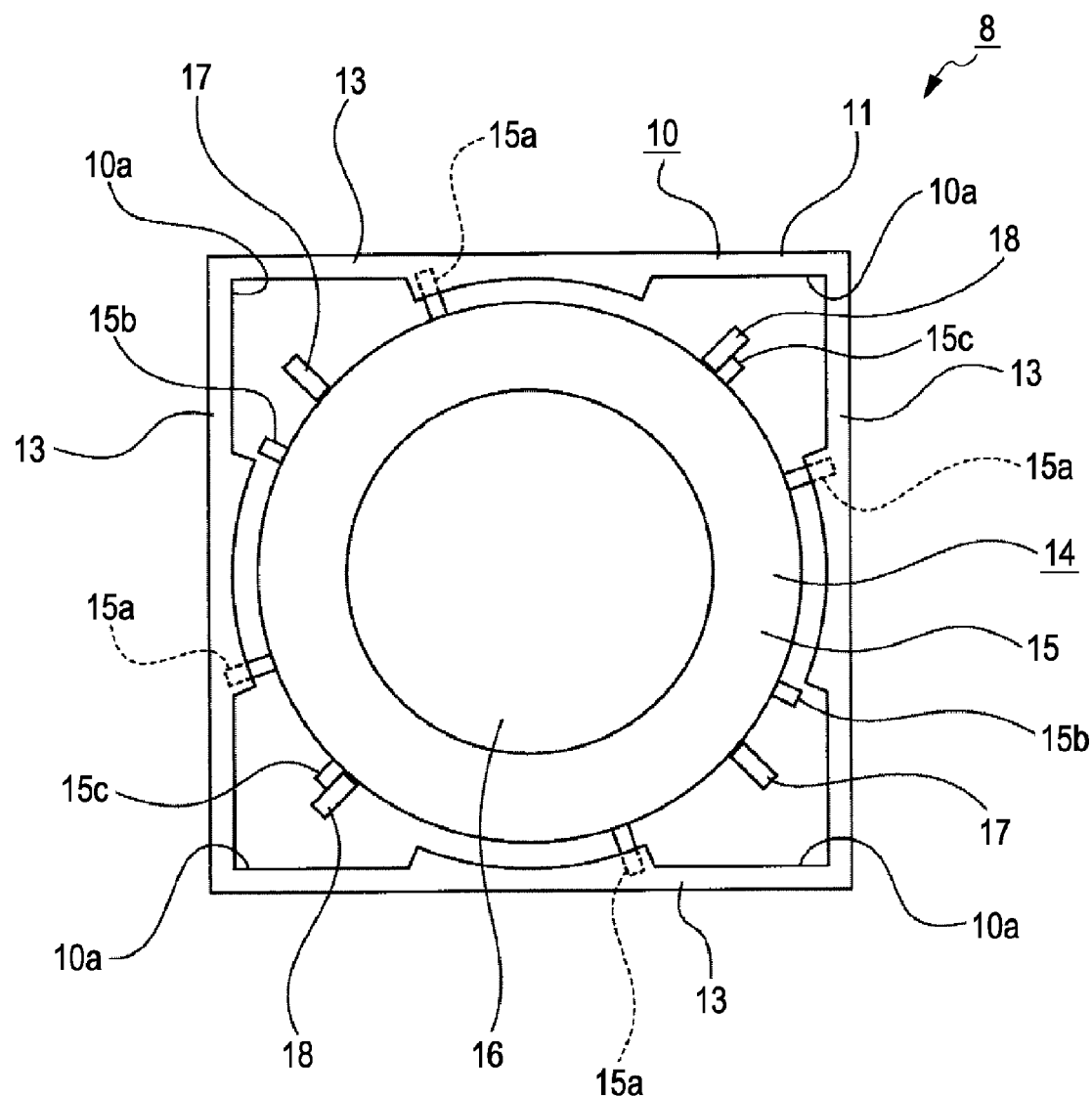
FIG. 5 is an enlarged front view showing a lens driver.

When the lens unit 14 is supported by the case 10, spaces 10a are formed at corners in the case 10 because the lens barrel 15 is substantially cylindrical and the frame 11 is substantially rectangular (see FIG. 5).

In the case 10, polymer actuators 17, 18, 17, and 18 are alternately arranged respectively at the spaces 10a. Accordingly, the polymer actuators 17 and 18 are arranged at an interval in the circumferential direction, at positions outside the outer peripheral surface of the lens unit 14.

Figure 6:
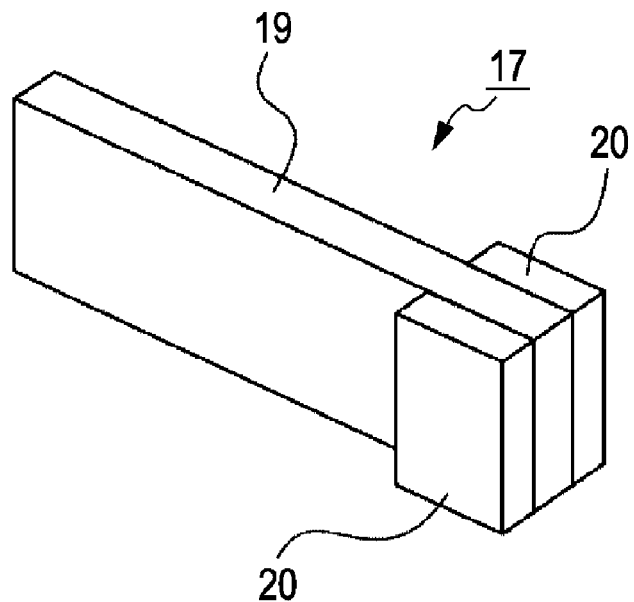
FIG. 6 is an enlarged perspective view showing a polymer actuator.

Referring to FIG. 6, each polymer actuator 17 includes a main body 19 extending in the front-rear direction, and a pair of electrodes 20 attached to, for example, a front end portion of the main body 19 such that the front end portion is pinched by the electrodes 20. The frame 11 has attachment portions (not shown) at an inner surface of the frame 11. Front end portions of the polymer actuators 17 are respectively attached to the attachment portions, and arranged in the spaces 10a.

Figure 7:
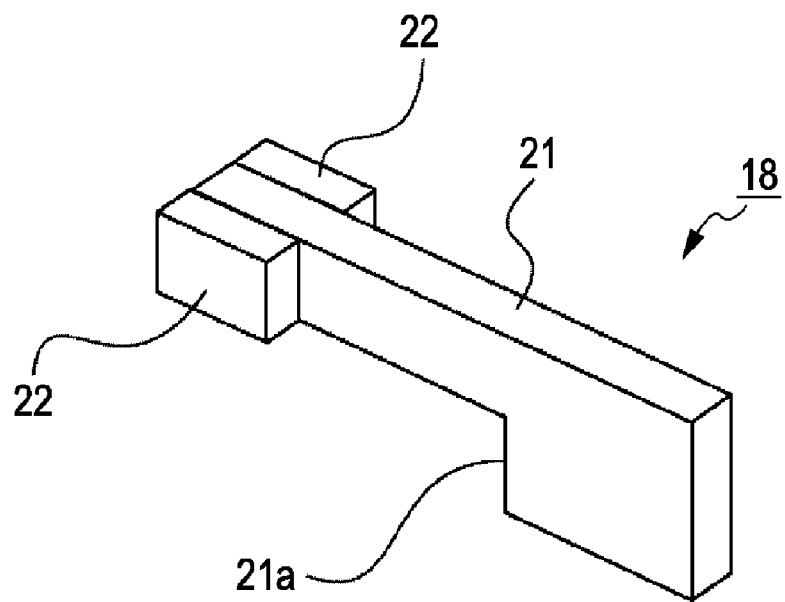
FIG. 7 is an enlarged perspective view showing another polymer actuator.

Referring to FIG. 7, each polymer actuator 18 includes a main body 21 extending in the front-rear direction, and a pair of electrodes 22 attached to, for example, a rear end portion of the main body 21 such that the rear end portion is pinched by the electrodes 22. A substantially front-half portion of the main body 21 protrudes toward the lens unit 14 with respect to other portion. A rear part of the substantially front-half portion of the main body 21 has a recess 21a which is cut to be open to the lens unit 14. The frame 11 has attachment portions (not shown) at the inner surface of the frame 11. Rear end portions of the polymer actuators 18 are respectively attached to the attachment portions, and arranged in the spaces 10a.

An operation of the lens driver 8 will be described below (see FIGS. 8 to 16).

Figure 8:
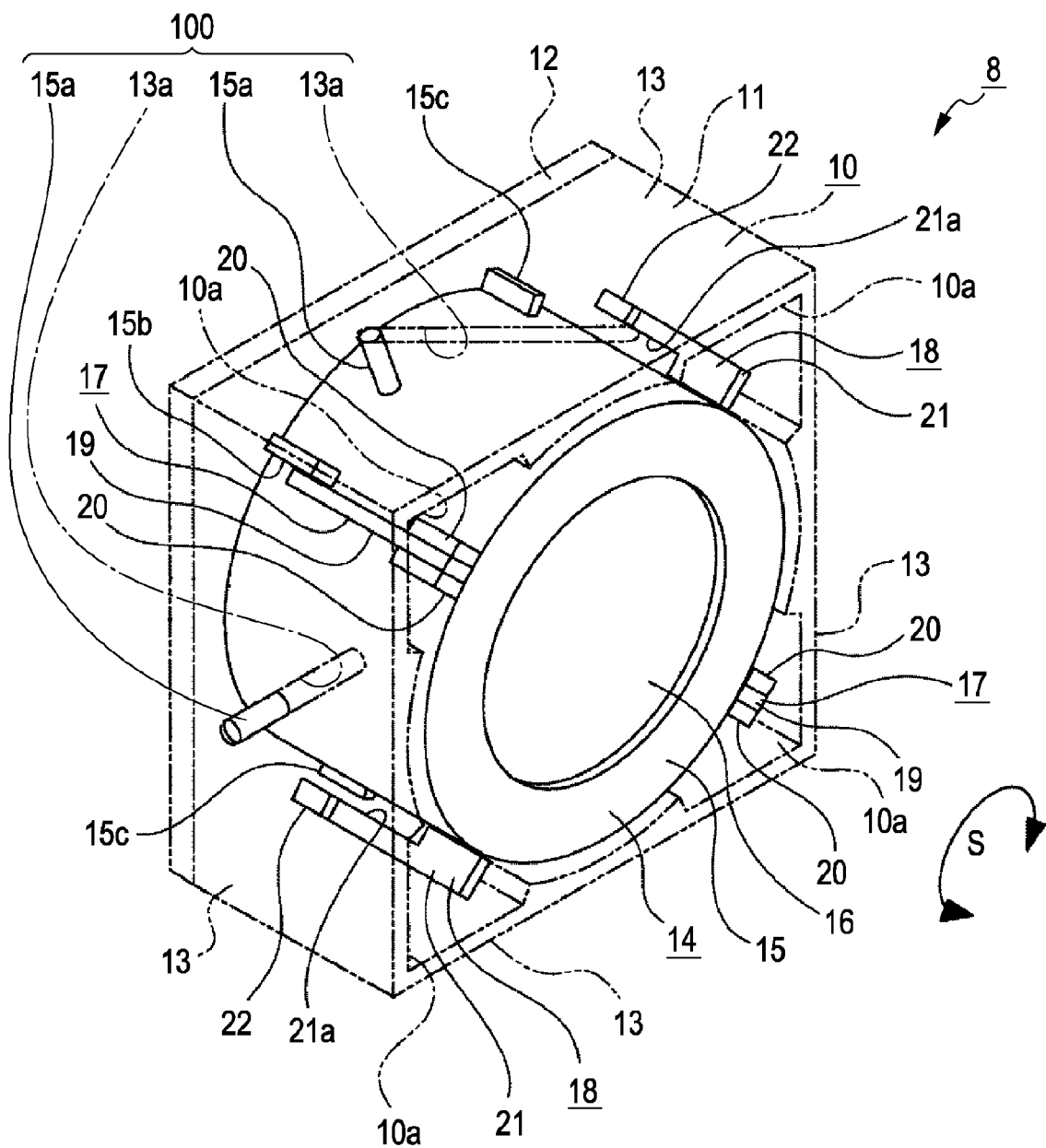
FIG. 8, together with FIGS. 9 and 10, shows a state where a lens unit is located at a rear movement end, and is an enlarged perspective view of the lens unit.
Figure 9:
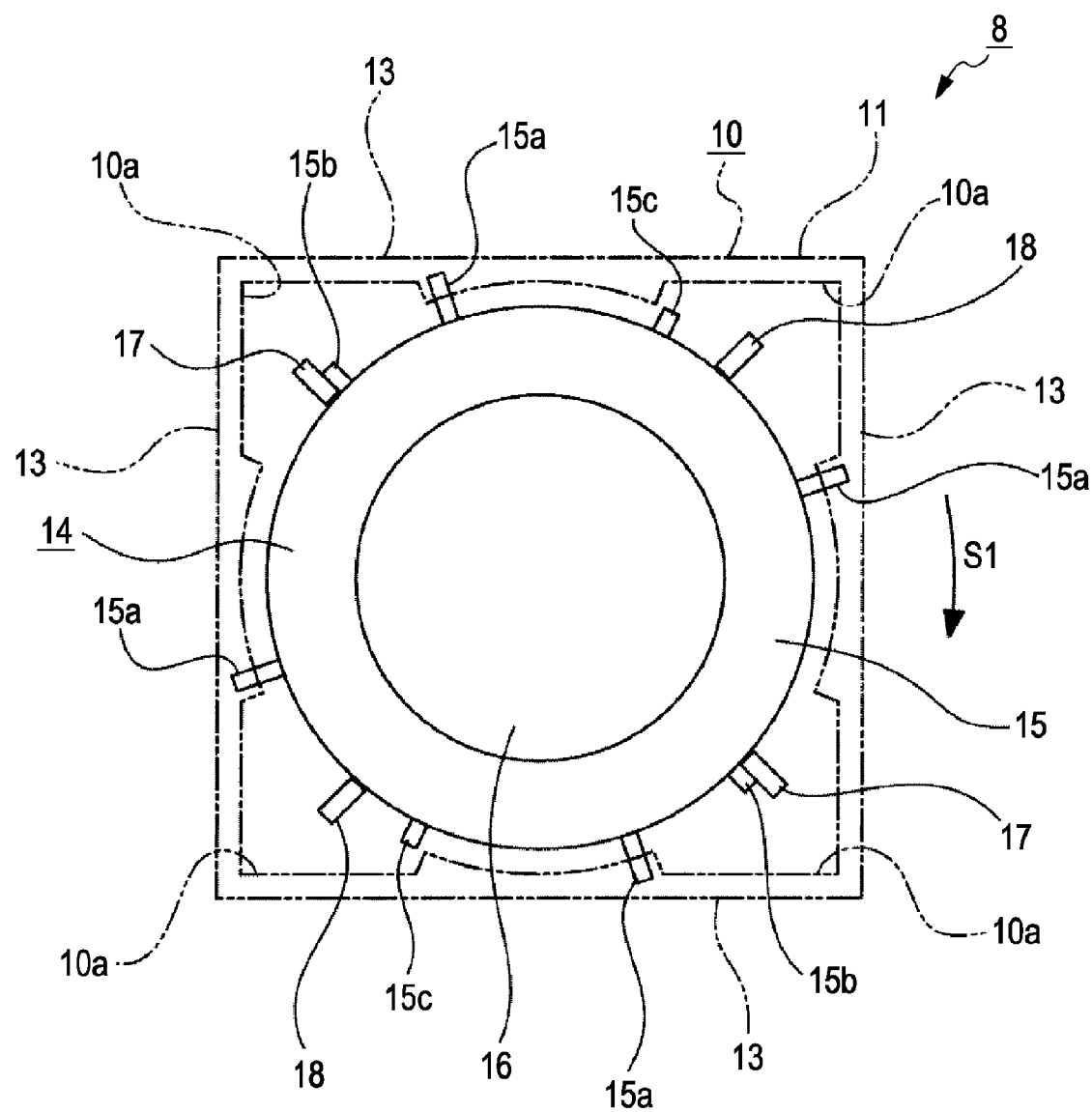
FIG. 9 is an enlarged front view of the lens unit.
Figure 10:
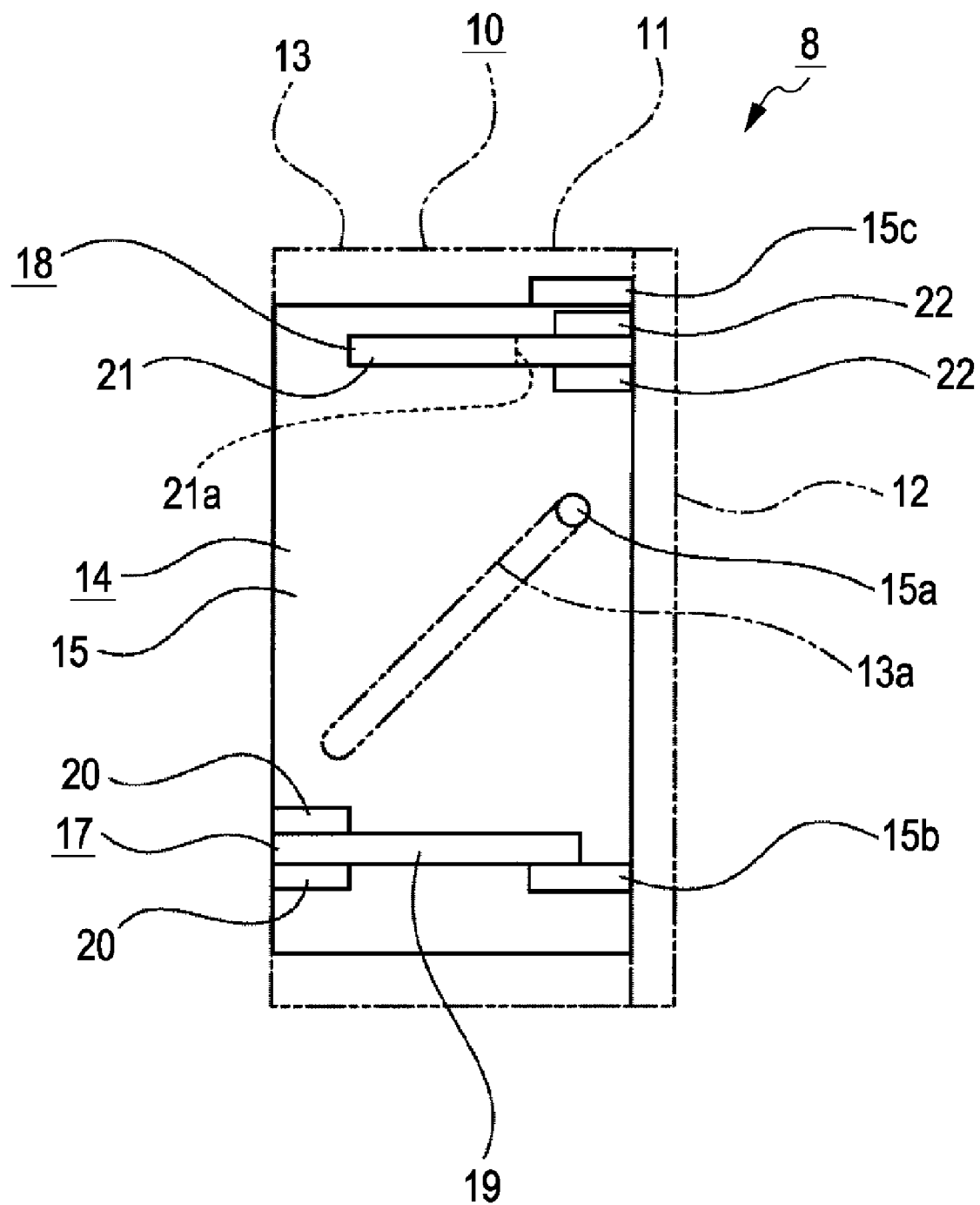
FIG. 10 is an enlarged side view of the lens unit.
Figure 11:
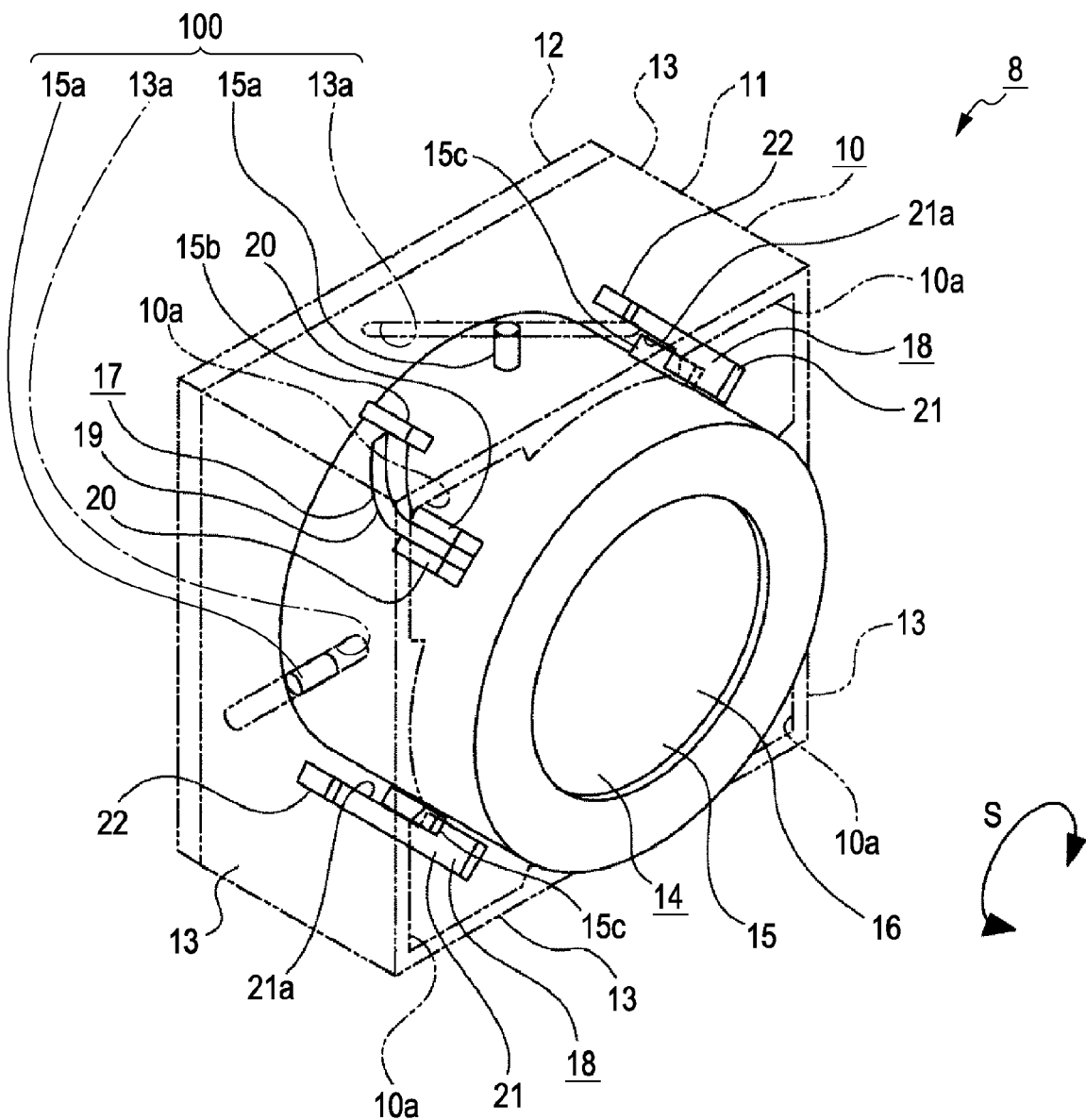
FIG. 11, together with FIGS. 12 and 13, shows a state where the lens unit is located at a middle position when the lens unit is moved forward, and is an enlarged perspective view of the lens unit.
Figure 12:
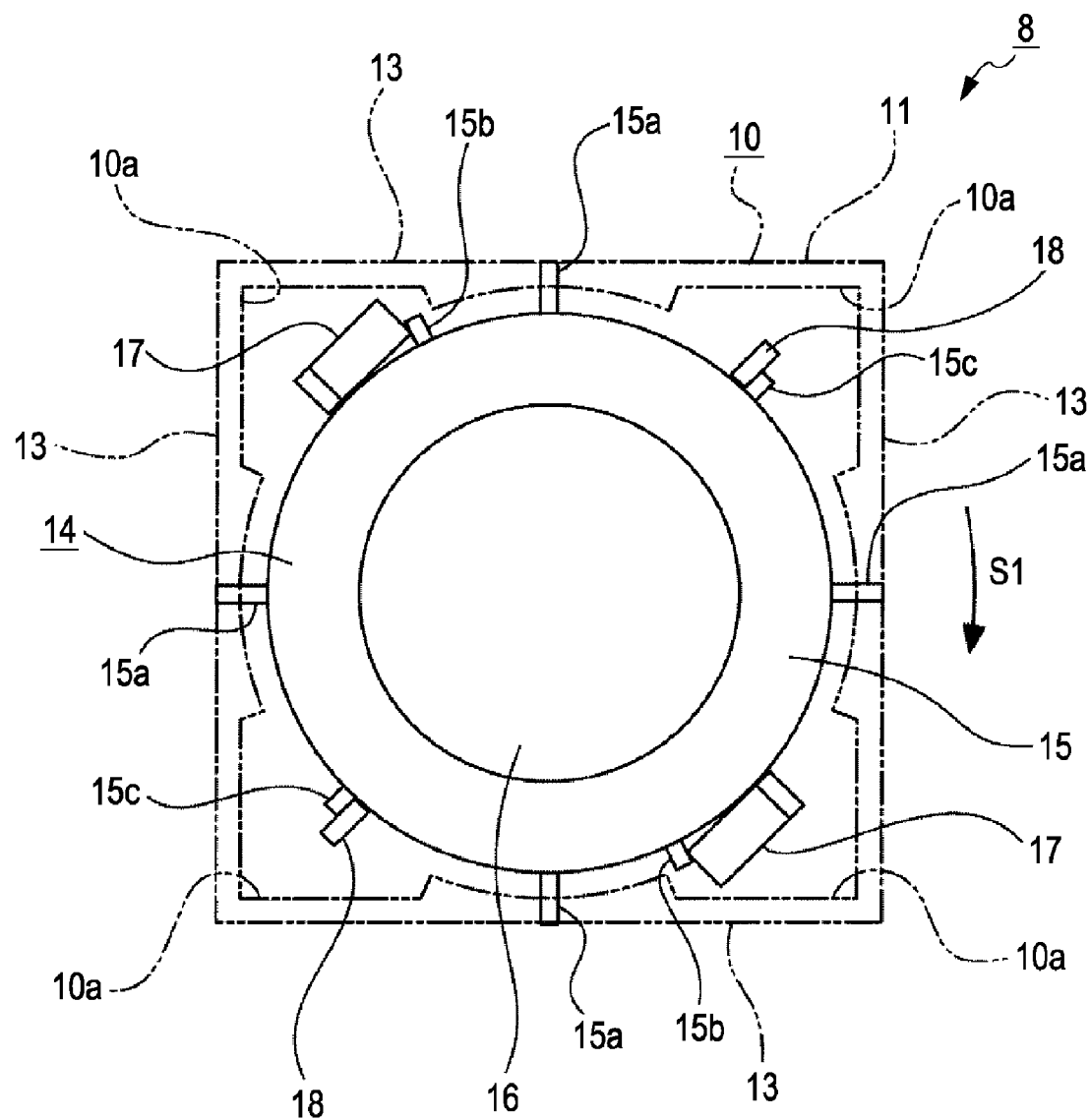
FIG. 12 is an enlarged front view of the lens unit.
Figure 13:
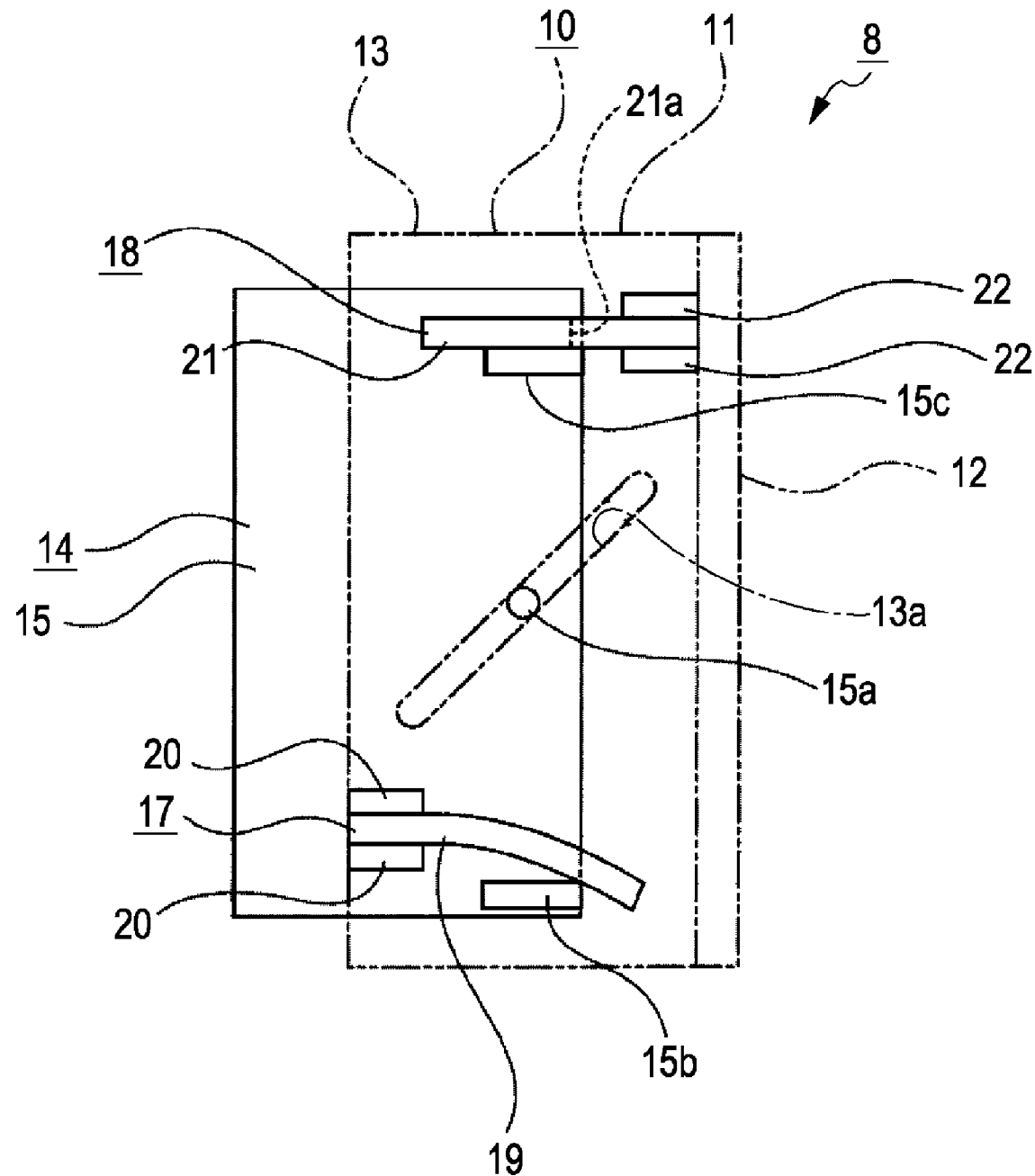
FIG. 13 is an enlarged side view of the lens unit.
Figure 14:
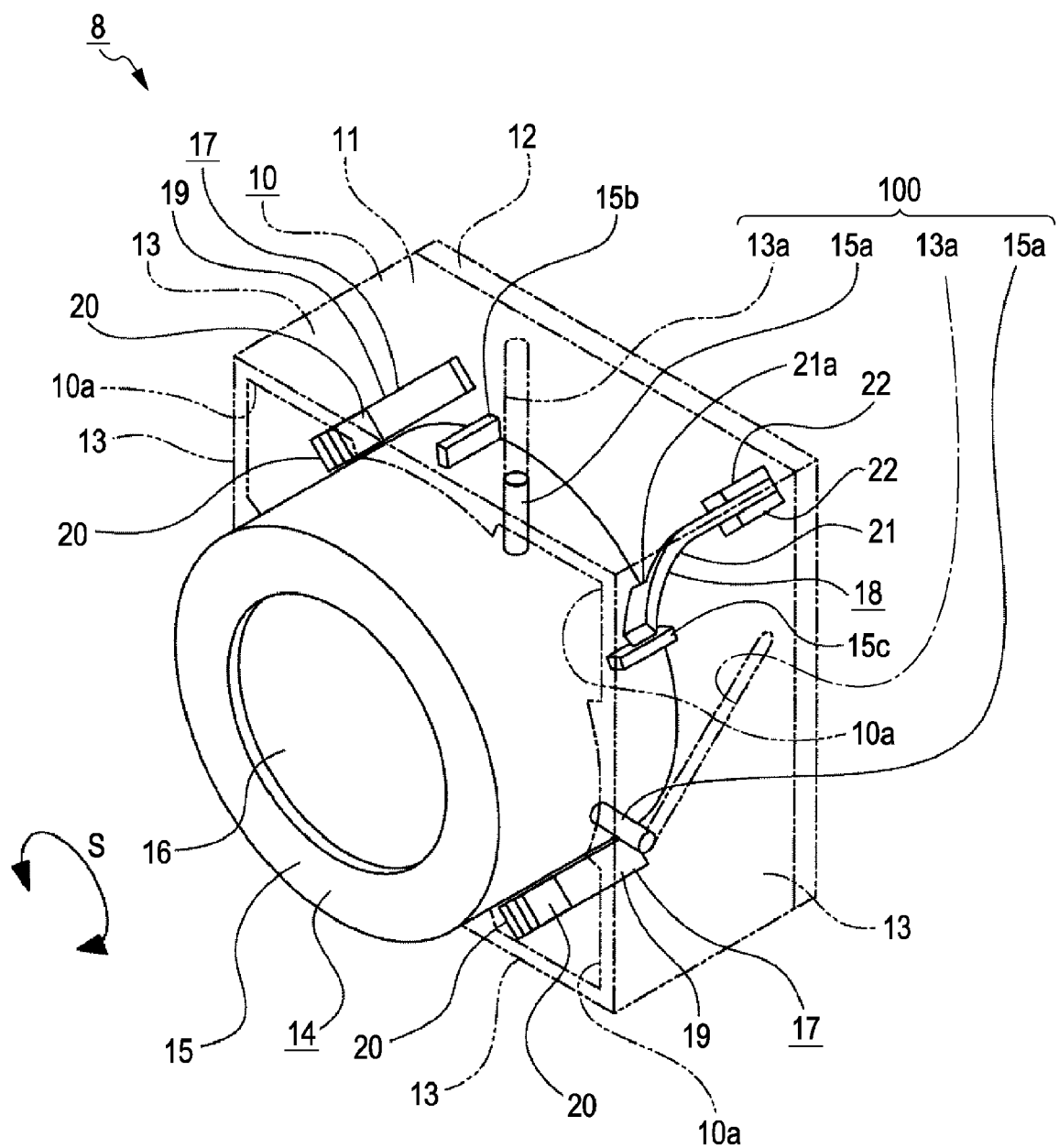
FIG. 14, together with FIGS. 15 and 16, shows a state where a lens unit is located at a front movement end, and is an enlarged perspective view of the lens unit.
Figure 15:
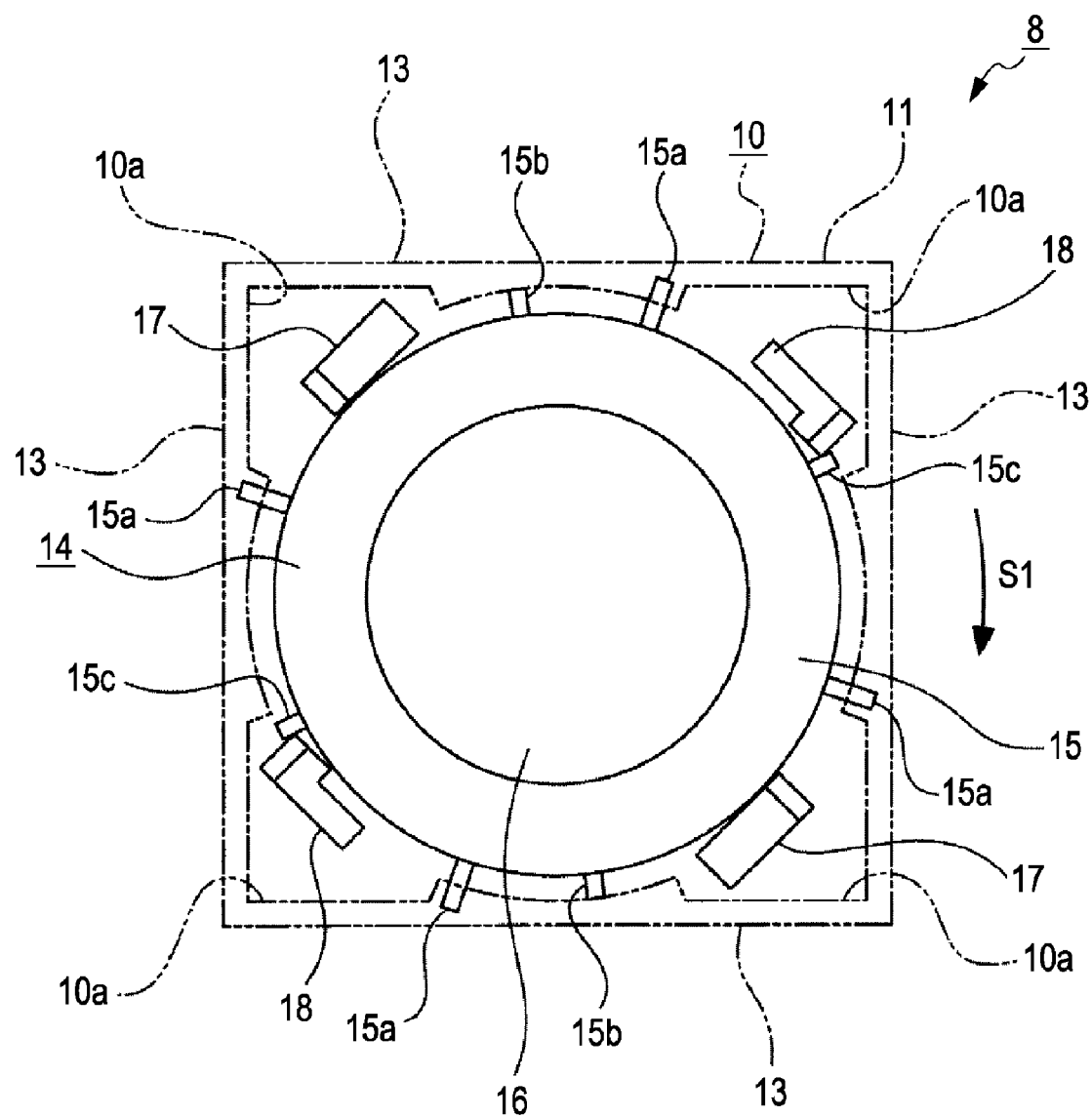
FIG. 15 is an enlarged front view of the lens unit.
Figure 16:
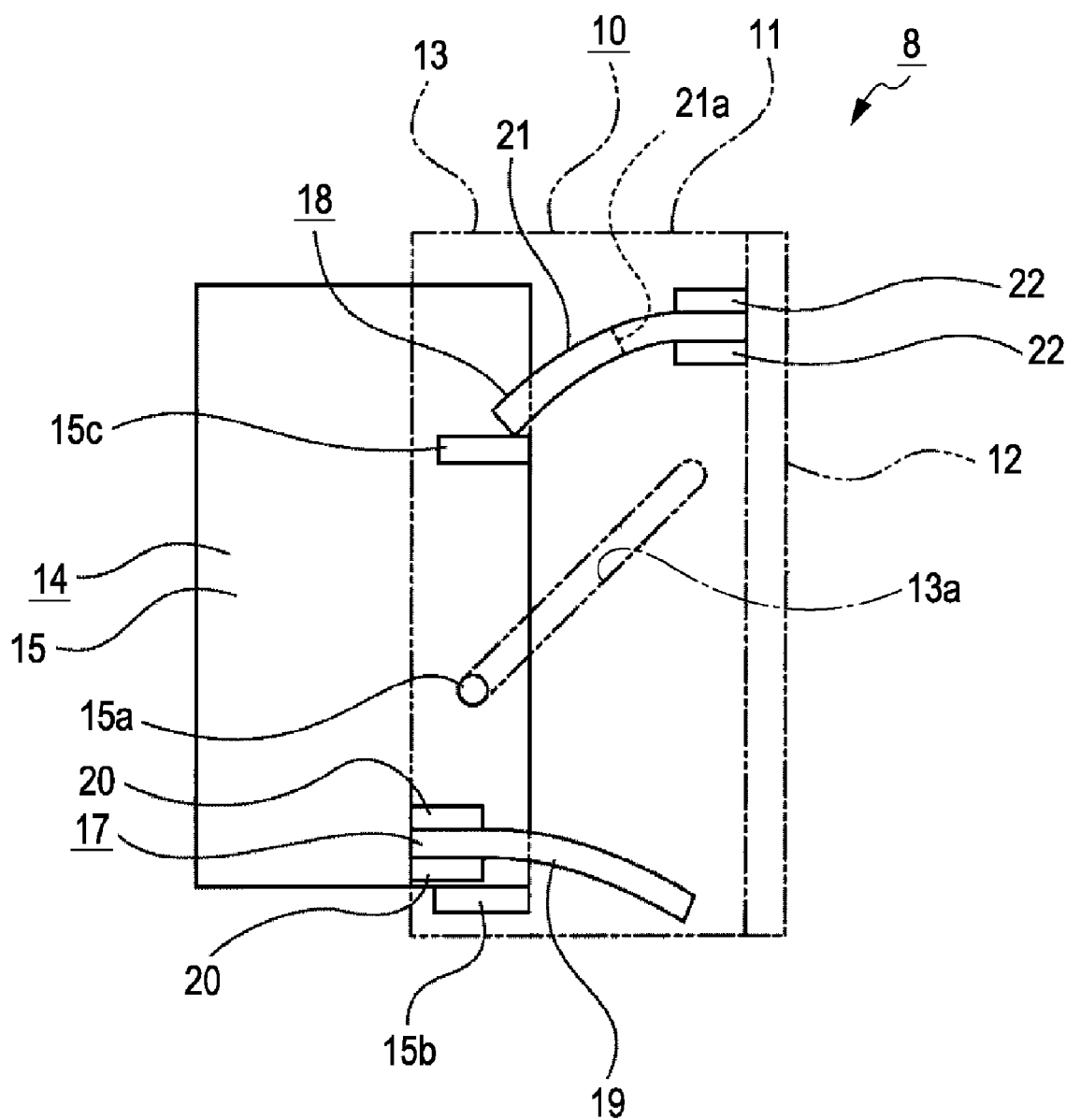
FIG. 16 is an enlarged side view of the lens unit.

First, an initial state, in particular, a state where the lens unit 14 is located at a rear movement end is described (see FIGS. 8 to 10).

In the initial state, the cam pins 15a of the lens unit 14 respectively engage with rear end portions of the cam grooves 13a of the case 10. The polymer actuators 17 contact or are located near the pressed portions 15b of the lens unit 14. The polymer actuators 18 are located at positions separated clockwise from the pressed portions 15c (in S1 direction shown in FIG. 9).

When being driven, a voltage is applied to electrodes 20 of the polymer actuators 17. When the voltage is applied to the electrodes 20 of the polymer actuators 17, the main bodies 19 are bent in a direction of pressing the pressed portions 15b. Hence, the pressed portions 15b are pressed by the main bodies 19 (see FIGS. 11 to 13). When the pressed portions 15b are pressed by the main bodies 19, the lens unit 14 is rotated clockwise (in S1 direction shown in FIG. 12). The cam pins 15a are moved through the cam grooves 13a. The lens unit 14 is moved forward against the biasing force of the biasing spring.

When the lens unit 14 is rotated clockwise as described above, the pressed portions 15c pass through the recesses 21a of the polymer actuators 18. When the pressed portions 15c pass through the recesses 21a of the polymer actuators 18, the pressed portions 15c are located near the polymer actuators 18 in the clockwise direction. At this time, since the lens unit 14 is moved forward, the substantially front-half portions of the main bodies 21 are located just beside the pressed portions 15c. When the lens unit 14 is moved forward and the substantially front-half portions of the main bodies 21 are located just beside the pressed portions 15c, the pressing operation of the polymer actuators 17 to the pressed portions 15c is completed.

Then, a voltage is applied to the electrodes 22 of the polymer actuators 18. When the voltage is applied to the electrodes 22 of the polymer actuators 18, the main bodies 21 are bent in a direction of pressing the pressed portions 15c. Hence, the pressed portions 15c are pressed by the main bodies 21 (see FIGS. 14 to 16). When the pressed portions 15c are pressed by the main bodies 21, the lens unit 14 is further rotated clockwise. The cam pins 15a are moved through the cam grooves 13a. The lens unit 14 is further moved forward against the biasing force of the biasing spring.

The forward movement of the lens unit 14 is completed when the lens barrel 15 contacts a stopper (not shown) provided at the case 10 and thus the lens unit 14 is located at a front movement end. When the forward movement of the lens unit 14 is completed, the cam pins 15a respectively engage with front end portions of the cam grooves 13a of the case 10.

The bent states of the main bodies 21 of the polymer actuators 18 are kept even when the application of a voltage to the electrodes 22 is ended. Hence, the lens unit 14 is located at the front movement end.

The lens unit 14 can be moved rearward by applying an inverse voltage to the electrodes 20 of the polymer actuators 17 and to the electrodes 22 of the polymer actuators 18.

When the inverse voltage is applied to the electrodes 20 and 22, the bent main bodies 19 and 21 are restored to the original states. When the main bodies 19 and 21 are restored to the original states, the pressing forces to the pressed portions 15b and 15c are released. The lens unit 14 is moved rearward by the biasing force of the biasing spring. The lens unit 14 is held at the rear movement end.

As described above, the lens driver 8 includes the polymer actuators 17 and 18 which are arranged outside the outer peripheral surface of the lens unit 14, are bent in the direction orthogonal to the optical-axis direction, and press the pressed portions 15b and 15c. In addition, the orthogonal transformation mechanism 100 converts the force in the pressing direction of the polymer actuators 17 and 18 into the moving force in the optical-axis direction, thereby moving the lens unit 14 forward.

Since the polymer actuators 17 and 18 are arranged outside the outer peripheral surface of the lens unit 14, the polymer actuators 17 and 18 can be arranged near the optical axis. Accordingly, the sizes of the lens unit 14 and the lens driver 8 in the direction orthogonal to the optical axis can be decreased.

Even when the bending amounts of the polymer actuators 17 and 18 are increased to provide a large moving amount of the lens unit 14 in the optical-axis direction, the polymer actuators 17 and 18 and the lens unit 14 do not have to be arranged in the optical-axis direction. The size can be decreased in the direction orthogonal to the optical axis.

Also, the plurality of polymer actuators 17 and 18 are provided, the polymer actuators 17 and 18 are successively bent to press the pressed portions 15b and 15c in sequence, and thus the lens unit 14 is continuously moved in the optical-axis direction.

During the movement of the lens unit 14, since the driving is switched between the polymer actuators 17 and the polymer actuators 18, it is not necessary to increase the lengths of the polymer actuators to increase the bending amounts, or it is not necessary to increase the voltage applied to the polymer actuators. Accordingly, a large moving amount of the lens unit 14 can be provided without an increase in size or an increase in cost.

While the example has been described in which the driving is switched only once between the polymer actuators 17 and the polymer actuators 18, the driving of the polymer actuators may be switched any number of times. The number of polymer actuators and the number of switching times of the driving may be determined in accordance with a necessary moving amount of the lens unit 14, to switch the driving.

In the lens driver 8, the polymer actuators 18 respectively have the recesses 21a. When the polymer actuators 17 are bent, the pressed portions 15c pass through the recesses 21a of the polymer actuators 18.

Thus, the forward moving operation of the lens unit 14 can be carried out without interruption. Accordingly, the lens driver 8 can be smoothly operated.

In addition, the electrodes 20 of the polymer actuators 17 are provided at the front end portions of the main bodies 19. The electrodes 22 of the polymer actuators 18 are provided at the rear end portions of the main bodies 21. Accordingly, during the movement of the lens unit 14, since the electrodes 20 and 22 are provided opposite to the bending portions of the main bodies 19 and 21, the operation efficiency can be increased.

Further, since the polymer actuators 17 and 18 are long in the front-rear direction and arranged such that longitudinal directions of the polymer actuators 17 and 18 are aligned with the optical-axis direction, the arrangement space can be efficiently used, and the size can be decreased.

In addition, since the polymer actuators 17 and 18 are arranged respectively in the spaces 10a at the corners in the case 10, the arrangement space can be efficiently used, and the size can be decreased.

While the example has been described in which the four polymer actuators 17 and 18 are arranged, the number of polymer actuators is not limited to four. The number of polymer actuators can be desirably determined depending on a necessary moving amount and a necessary moving force of the lens unit 14.

The specific shapes and structures of the members described in the preferred embodiment of the present invention are merely examples to implement the present invention. It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A lens driver comprising:
a lens unit including a lens holding frame having a plurality of pressed portions at an outer peripheral surface of the lens unit, a lens being held by the lens holding frame, the lens unit being movable in an optical-axis direction of the lens;
a plurality of polymer actuators arranged outside the outer peripheral surface of the lens unit and having electrodes to which a voltage is applied, the plurality of polymer actuators configured to be successively bent in a direction orthogonal to the optical-axis direction and press the plurality of pressed portions of the lens holding frame in sequence in the direction orthogonal to the optical-axis direction when the voltage is applied to the electrodes; and
an orthogonal transformation mechanism configured to convert a force in a pressing direction into a moving force in the optical-axis direction and continuously move the lens unit in the optical-axis direction when the plurality of pressed portions of the lens holding frame are respectively pressed by the plurality of bent polymer actuators.

2. The lens driver according to claim 1,
wherein at least one of the plurality of polymer actuators has a recess, and
the recess polymer actuator wherein assuming that the plurality of polymer actuators without recess are first actuators and that the polymer actuator with the recess is a second polymer actuator, at least one of the pressed portions passes through the recess of the second polymer actuator when the first polymer actuator is bent.

3. The lens driver according to claim 1, wherein at least a part of each electrode of each of the plurality of polymer actuators is separated in the optical-axis direction.

4. The lens driver according to claim 1,
wherein the plurality of polymer actuators are long in one direction, and
wherein a longitudinal direction of the plurality of polymer actuators are aligned with the optical-axis direction.

5. The lens driver according to claim 1,
wherein the lens holding frame is substantially cylindrical,
wherein the lens driver further includes a case, the case having a rectangular frame portion and being arranged to surround the lens holding frame from the outside of the outer peripheral surface, and
wherein at least one of the plurality of polymer actuators is arranged at least at one of four corners in the frame portion.

6. An image pickup apparatus comprising:
a lens unit including a lens holding frame having a plurality of pressed portions at an outer peripheral surface of the lens unit, a lens being held by the lens holding frame, the lens unit being movable in an optical-axis direction of the lens;

an image pickup device configured to convert an optical image acquired by the lens into an electric signal;

a plurality of polymer actuators arranged outside the outer peripheral surface of the lens unit and having electrodes to which a voltage is applied, the plurality of polymer actuators configured to be successively bent in a direction orthogonal to the optical-axis direction and press the plurality of pressed portions of the lens holding frame in sequence in the direction orthogonal to the optical-axis direction when the voltage is applied to the electrodes; and an orthogonal transformation mechanism configured to convert a force in a pressing direction into a moving force in the optical-axis direction and continuously move the lens unit in the optical-axis direction when the plurality of pressed portions of the lens holding frame are respectively pressed by the plurality of bent polymer actuators.

* * * * *